Patented Sept. 27, 1949

2,482,761

UNITED STATES PATENT OFFICE 2,482,761

POLYMERIZATION OF UNSATURATED FATTY ACIDS

Charles G. Goebel, Cincinnati, Ohio, assignor to Emery Industries, Inc., Cincinnati, Ohio, a corporation of Ohio No Drawing. Application July 6, 1946, Serial No. 681,765

15 Claims. (Cl. 260—407)

This invention relates to the production of high molecular weight carboxylic acids and more particularly to the preparation, by polymerization, of acids containing two or more carboxyl groups in the molecule, from unsaturated fatty material.

High molecular weight polycarboxylic acids are used in forming various resinous and plastic materials. Examples are alkyd resins, polyamide resins, adhesives, and the like, all of which can be formed in condensation reactions involving high molecular weight polycarboxylic acids.

Past methods for producing these acids from fatty materials have required expensive methods which are cumbersome in commercial use. According to one method, a methyl ester is formed from a drying oil, such as linseed, soya, or tung. The methyl ester is then heated to polymerizing temperatures to form polyesters. The polyesters are distilled to remove monomeric esters, and the polyesters are split to yield polyacids. This method yields polyacids having a high acid value but gives only moderate yields in the order of 50 per cent or less based on the unsaturated raw material available for polymerization.

Another method which has been suggested is the direct polymerization of a drying or semi-drying glyceride oil, following which the polymerized oil is hydrolyzed and low molecular weight, unpolymerized materials are removed by distillation to give a residue of polycarboxylic acids. This method tends to produce gels before polymerization is complete, gives small yields of acids, and is generally unsatisfactory and little used.

Drying or semi-drying oils are readily hydrolyzed either in high pressure apparatus or with the aid of a catalyst to produce unsaturated monocarboxylic acids and glycerine. Previous attempts to polymerize the unsaturated acids have been unsuccessful and have usually produced only a cracked, decarboxylated, darkened tarry mass which commercially is useless. This undesirable result is obtained because the unsaturated acids are unstable at polymerizing temperature and tend to break down. The extent of the decompositions is shown by the following results obtained when linseed fatty acids were heated at atmospheric pressure in the presence of $CO_2$ at 275° C. for 6 hours.

| Material | Neutralization Equivalent |
|---|---|
| Original Linseed fatty acids | 287 or 98.2% FFA as oleic acid. |
| After heating for 6 hours | 400 or 70.5% FFA as oleic acid. |

To further demonstrate the decomposition rate, linseed fatty acids were heated in an autoclave at 350° C. and 200# $CO_2$ pressure. The following table shows the results obtained.

| Time, Hrs. | Temp., °C. | $CO_2$ Pres., lbs./in.² | Iodine Value | Neutralization Equivalent | FFa as Oleic |
|---|---|---|---|---|---|
| 0 | 23 | 0 | 196 | 285 | 98.9 |
| 0.5 | 350 | 200 | 104.5 | 295 | |
| 1.0 | 350 | 200 | 88.8 | 315 | |
| 2.25 | 350 | 200 | 73.8 | 458 | |
| 3.0 | 350 | 200 | 65.8 | 517 | |
| 4.5 | 350 | 200 | 61.0 | 789 | 35.3 |

The values in the above table show that almost ⅔ of the acid groups have decomposed. Thus, it has not heretofore been feasible to polymerize unsaturated fatty acids directly.

The principal objective of this invention has been to provide a method by which polymeric acids can be derived directly from fatty acids without the necessity of resorting to the production of intermediate compounds which must later be decomposed in steps which contribute nothing and only add to the cost and complexity of processing.

It has been a further objective of this invention to provide a method of producing polymeric acids which contain a much greater percentage of dimeric acids and a lower content of trimeric acids than are obtained by the conventional methods heretofore used.

I have found that unsaturated acids can be caused to polymerize by means of heat without undergoing decomposition, if heating is conducted in the presence of small amounts of water, that is, amounts in the order of a few percent of water based on the weight of fatty acid being processed. The amount of water required is, in fact, so small that no free water as such appears to exist during the heating operation, the water required actually being dissolved in the acids. This quantity of water is maintained in the system at the elevated temperatures employed by the application of moderate steam pressures or other suitable means.

It is a rather remarkable and unanticipated result that such small amounts of water can so completely inhibit the decomposition reactions normally obtained. A further surprising result, the reason for which I have not been able satisfactorily to explain, is that when the polymerization is carried out by the method just described, there is much less tendency for trimeric condensation products to be formed than are obtained in ordinary methods of polymerization. For many purposes, the dimeric products are much to be preferred as linear type high molecular weight polymer compounds can be formed from dimer acids without the formation of gelled insoluble three dimensional polymers, which are formed from trimeric and higher polymeric compounds.

Thus I have determined, by molecular distillation, that I obtain from soya bean or cottonseed acids about 90% of dimeric material as compared to only 60% by the methods heretofore used. Linseed acids have a pronounced tendency to form trimeric products yet I am able, by the present method to obtain over 83% yields of dimer compounds from linseed oil fatty acids.

The improved properties of the acids produced by the method of this invention are further emphasized by the fact that even the polymer acids of linseed oil as produced by my invention can be heated to polymerization temperatures with an equivalent weight of, for example, ethylene diamine, for up to 2½ days before signs of gelation occur, while the products prepared from linseed esters by the previously employed methods produce insoluble jells in from 20 to 40 minutes, under the same heating conditions, the rapid tendency for gelation to occur being indicative of high trimeric acid content in the conventionally produced polybasic acids.

The dibasic and tribasic (and polybasic) acid contents of the products from the process of this invention as compared to those from conventional methods were determined by molecular distillations of methyl esters. The results of these distillations are tabluated below:

steps, for example, by solvent separation. The resultant residual polycarboxylic acids are usually of a light straw yellow color and of a heavy viscous consistency. They are readily adaptable for use in forming resins and are satisfactory for all the common uses of polymerized acids and may be substituted for more expensive dicarboxylic acids for many purposes.

It is usually necessary to heat for a period of from 3 to 8 hours to produce substantially complete polymerization of di and tri unsaturated material. A temperature of at least 260° centigrade must be used and preferably from 330 to 360° centigrade. Where low temperatures are used, longer heating times are necessary.

I prefer to use from 80 to 300 pounds per square inch of steam pressure in the reaction vessel during polymerization. It is not necessary that any liquid water be present in the reaction vessel during heating; and, thus, super-heated steam may be employed as an atmosphere over the reactants. Steam pressure as low as 40 pounds per square inch can be used but for best operation a steam pressure of at least 80 pounds per square inch is used. While much higher steam pressures may be used ranging up to the steam pressure of saturated steam at the temperatures involved, pressures above 400 pounds per square inch are unnecessary and only add to the cost of the pressure equipment which must be used. My preferred pressure is approximately 80 pounds per square inch, for at this pressure a good polymer product is obtained, and it is unnecessary to employ especially designed high pressure equipment.

The precise action of steam in the polymeriza-

| Raw Material | Process | Per Cent Dimer | Per Cent Trimer | Molar Ratio Dimer-Trimer |
|---|---|---|---|---|
| Soy Bean Fatty Acids | This Invention | 91.9 | 8.1 | 17/1 |
| Linseed Fatty Acids | do | 83.5 | 16.5 | 7.5 |
| Cottonseed Fatty Acids | do | 89.95 | 10.05 | 13.47/1 |
| Esters of Soy Acids | Conventional Method | 63.7 | 36.3 | 2.63/1 |

In Bulletin NM-248A, Progress Report: Norepol and Its Derivatives, published by the Northern Regional Research Laboratory, United States Department of Agriculture, August 23, 1943, it is reported that when linseed esters are polymerized, the dibasic acid content is approximately 35% and the tribasic and polybasic content is about 65% which gives a molar dimer/trimer ratio of 0.81/1. When esters of soy bean fatty acids were polymerized by their method, the dibasic acid content was about 57%, and the tribasic and polbasic content was about 43%. This gave a molar dimer/trimer ratio of 1.98/1. Other ratios of dimer/trimer on products by their process varied from 1.5 to 3.4.

To carry out the process of my invention, I take unsaturated fatty acids prepared by the hydrolysis of a fat or oil for example, soya bean fatty acids, add a small portion of water, and heat in a pressure vessel. My preferred method is to attach a steam line to the pressure vessel containing the acids and introduce sufficient steam to hold an atmosphere of steam over the acids while heating. The acids are heated until substantially all the di and tri unsaturated fatty acids present polymerize. The resultant product can then be further heated at reduced pressure, to distill off vaporizable constituents, which include mainly saturated acids and monounsaturated acids. If desired, the polymerized product can be separated from impurities by other conventional separation tion is not known; however, the steam does not appear to act merely as an inert atmosphere over the polymerizing acids. On the contrary, it appears to exert a chemical influence in the polymerization process. As already pointed out, attempts to polymerize in the presence of nitrogen or carbon dioxide have been unsuccessful and have produced only a decarboxylated, tarry material typical of attempts to polymerize acids in the absence of steam. It may be that the presence of small amounts of moisture dissolved in the polymerizing acids inhibits decarboxylation. However, no attempt is here made to proffer a theoretical explanation of the practical result.

The method of this invention is useful for producing polymer acids from any of the common raw materials ordinarily used as sources for polyunsaturated fatty material. Soya bean oil, linseed oil, cottonseed oil and fish oils are typical examples. Of course, the characteristics of the final polymer acid product will vary with the material used.

Saturated and monounsaturated material normally occurs associated with polyunsaturated material. Saturated acids do not polymerize and therefore, form an inert diluent during polymerization. Partial polymerization of oleic acid and other mono-unsaturated acids can be obtained, but the yields are much less satisfactory than those when more highly unsaturated material is used. Therefore, if desired, the acid stock may be separated either by chilling and pressing or by solvent methods, or by other appropriate separation methods to remove saturated and monounsaturated acids prior to polymerization.

However, separation before polymerization is not necessary to the practice of this invention and acids may be polymerized in the presence of unreactive saturated and monounsaturated acids. After polymerization, the unreactive material can be topped off from the polymer acids by simple vacuum distillation in the conventional manner. The use of this process to separate polyunsaturated acids from crude oleic acid is disclosed and claimed in my co-pending application S. N. 678,160.

Various catalysts may be employed in the polymerization to speed up the reaction, to prevent the formation of by-products, and to improve the yields of polybasic acids. However, catalysts are not necessary and the polymerization can be carried out without their use. The use of catalysts also introduces another step in the process for their removal. Numerous catalysts can be used including mercuric acetate, lead acetate, anthraquinone, and Raney nickel. The best results are obtained using mercuric acetate and Raney nickel.

The following examples are given to illustrate the invention and to teach its practice to those skilled in the art but are not intended to limit the scope of the invention except as pointed out in the claims.

Example 1

A batch of commercial linseed fatty acids having an iodine value of 190 and a free fatty acid content of 99 per cent (as oleic) was heated for 7½ hours in a pressure vessel at a temperature of 350° centigrade. A steam pressure of between 380 and 463 pounds per square inch was maintained in the vessel. Samples were withdrawn hourly and analyzed. The following table shows the experimental conditions.

| Time, Hrs. | Temp., °C. | Pres., lbs./in.² | Iodine Value | Neutralization Equivalent |
|---|---|---|---|---|
| 0 | 350 | 380 | 190 | 285 |
| 1 | 348 | 395 | 115 | 289 |
| 2 | 348 | 410 | 104 | 289 |
| 3 | 349 | 420 | 101 | 289 |
| 4 | 349 | 430 | 93.5 | 293 |
| 5 | 349 | 440 | 92.2 | 291 |
| 6 | 351 | 458 | 86.2 | 292.5 |
| 7 | 349 | 462 | 86 | 295 |
| 7.5 | 347 | 463 | 83.3 | 296 |

The fact that the neutralization equivalent increased only from 285 to 296 as compared to an increase to 798 in the absence of water, as shown above, shows the remarkable stabilizing effect obtained.

At the end of seven and one half hours, the vessel was cooled and the pressure removed. The vessel contents were moved to a reduced pressure still and topped to remove relatively low boiling material to give a distillate and residue as follows:

| Material | Per Cent | Iodine Value | Neutralization Equivalent |
|---|---|---|---|
| Distillate | 39.3 | 80 | 278.5 |
| Residue | 60.7 | 111 | 310 |

The residue was heated with a chemical equivalent of ethylene diamine first at 150° centigrade for 1½ hours and then at 200° to 210° centigrade for one hour. Upon cooling, a hard, tough, brittle plastic composition was formed indicating the acids used were polybasic in composition. The polyamides thus formed were heated for 12 hours at 260° C. and still showed no tendency to gel showing that the acids used were mainly dibasic in composition.

Example 2

400 parts by weight of commercial linseed oil fatty acids having an iodine value of 190 and 1 part by weight of anthraquinone catalyst were heated for three hours to 350° centigrade while steam at a pressure of 85 pounds per square inch was passed over the surface of the acids. During the 3 hour heating periord, 20 per cent of the starting acids distilled from the reaction vessel with the steam. The remaining product was topped. The residual product represented 56 per cent by weight of the starting acids, had an iodine value of 95.5 and a neutralization equivalent of 312.

Example 3

300 parts by weight of a sardine oil having an iodine value of 188 were pressure split with 600 parts of water at 260° centigrade. Three treatments of 1½, ½, and ½ hour duration were used with 100 parts of the water employed in each treatment.

Water was withdrawn and the wet acids were heated to 350° centigrade at a pressure of 250 pounds per square inch for 4½ hours.

The product was then heated at reduced pressure to distill off unpolymerized material yielding 44% by weight of a residue having an iodine value of 86.3 and a neutralization equivalent of 386. The residue was dark in color and viscous and had no fish odor. These acids had drying properties when exposed to the air.

Example 4

2000 parts by weight of linseed oil fatty acids having an iodine value of 190, two parts by weight of lead acetate, and 6 parts by weight of mercury acetate were heated at 350° centigrade for seven hours under a steam pressure of from 300 to 400 pounds per square inch. The product was bleached and filtered using 4 parts of phosphoric acid, and 60 parts of bleaching earth with a small amount of filter aid. The material was heated at reduced pressure to distill off monomers. 42 percent of the material distilled over leaving a residue of 58 per cent having an iodine value of 96 and a neutralization equivalent of 310.

Example 5

1000 parts by weight of soy bean fatty acids having an iodine value of 137.5 and a neutralization equivalent of 280 were heated in an autoclave for 6 hours at 350° C., under a steam pressure of 300#/in.². The product was dried and bleached with 3% bleaching earth. The unpolymerized fatty acids were removed from the polybasic fatty acids by distillation under reduced pressure. The polybasic acids were of a straw yellow color and comprised 485 parts which is a yield of 48.5% based on the weight of the starting soy bean fatty acids. They were characterized by analysis:

| Material | Iodine Value | Neutral Equivalent |
|---|---|---|
| Polybasic Acids | 89.6 | 310 |

This product is not nearly so viscous as that obtained from linseed fatty acids by the same process.

The method of this invention produces polycarboxylic acids without the involved steps of the earlier methods. Moreover, a larger percentage of the original polyunsaturated material is transformed into polycarboxylic acids than by older methods and the acids produced are of a better color.

A further advantage of the present method is that by it, larger yields of dimeric acids are formed and less of the trimeric and higher polymeric acids are formed. In the formation of linear polymers, a dimer acid is preferable because with it a more linear type polymer is formed than with trimeric or higher acids and with dimeric acids there is less tendency toward the formation of insoluble gels when resinous condensation products are formed with the acids. Thus, the acids of this invention are of greater value than acids produced by other methods because of the higher content of dimeric acids.

Having described my invention I claim:

1. A method of preparing an acid having a plurality of carboxyl groups in the molecule which comprises heating a polyunsaturated fatty acid at an elevated pressure and a polymerizing temperature of at least about 260° C. in the presence of a small amount of water which is sufficient to prevent decarboxylation during the said heating.

2. A method of preparing a polymerized polyunsaturated fatty acid having a plurality of carboxyl groups in the molecule which comprises heating a polyunsaturated fatty acid at a polymerizing temperature of at least about 260° C. in the presence of steam at a pressure between 40 pounds per square inch and the pressure of saturated steam at the polymerizing temperature for a period of time sufficient to polymerize polyunsaturated fatty acid, the steam being applied to provide water in the fatty acid during polymerization sufficient in amount to prevent substantial decarboxylation thereof.

3. A method of preparing a polymerized substance having a plurality of carboxyl groups in the molecule which comprises heating a polyunsaturated fatty acid at a polymerizing temperature of at least about 260° C. in the presence of steam at a pressure of approximately 80 pounds per square inch for a period of time sufficient to polymerize the polyunsaturated fatty acid, the steam being applied to provide water in the fatty acid sufficient to prevent substantial decarboxylation of the fatty acid.

4. A method of preparing an acid having a plurality of carboxyl groups in the molecule which comprises heating a mixture of fatty acids including polyunsaturated fatty acids at a polymerizing temperature of at least about 260° C. in the presence of steam under pressure for a sufficient time to polymerize substantially all the polyunsaturated fatty acids, and then distilling to remove unpolymerized acids the steam being applied to provide water in the fatty acids sufficient to prevent substantial decarboxylation thereof.

5. A method of preparing a polymerized fatty acid substance having a plurality of carboxyl groups in the molecule which comprises heating a mixture of fatty acids containing polyunsaturated fatty acids at a temperature of approximately 260° to 360° centigrade in the presence of steam at a pressure between 80 pounds per square inch and the pressure of saturated steam at the temperature used for a period of time sufficient to polymerize polyunsaturated fatty acid, the said steam being applied to provide water in the fatty acid sufficient in amount to prevent substantial decarboxylation thereof during polymerization.

6. A method in accordance with claim 5 in which the acid is further treated at a reduced pressure to distill off unreacted material.

7. A method of preparing an acid having a plurality of carboxyl groups in the molecule which comprises heating soya bean fatty acids at a polymerizing temperature of at least about 260° C. in the presence of steam the steam being applied to provide water in the fatty acids sufficient to prevent substantial decarboxylation thereof.

8. A process in accordance with claim 7 in which the polymerized product is further heated to distill off unreacted materials.

9. A method of preparing an acid having a plurality of carboxyl groups in the molecule which comprises heating soya bean fatty acids at a polymerizing temperature of at least about 260° C. in the presence of steam at a pressure of between 80 pounds per square inch and the pressure of saturated steam at the said polymerizing temperature, the said steam being applied to provide water sufficient in amount to prevent substantial decarboxylation of the fatty acid during the polymerization thereof.

10. A method of preparing an acid having a plurality of carboxyl groups in the molecule which comprises heating soya bean fatty acids at a polymerizing temperature of at least about 260° C. in the presence of steam at a pressure of between 40 pounds per square inch and the pressure of saturated steam at said temperature the said steam being applied to provide water in said fatty acid sufficient in amount to prevent decarboxylation thereof during the said polymerization.

11. A method of preparing an acid having a plurality of carboxyl groups in the molecule which comprises heating linseed oil fatty acids at a polymerizing temperature of at least about 260° C. in the presence of steam at a pressure of between 40 pounds per square inch and the pressure of saturated steam at said temperature said steam being applied to provide water in said fatty acids which is sufficient in amount to prevent substantial decarboxylation thereof during the said polymerization.

12. A method of polymerizing polyunsaturated acids comprising heating them to polymerization temperatures of at least about 260° C. in the presence of from 1 to 5% of water under pressure sufficient to maintain water in the fatty acids during polymerization and thereby prevent substantial decarboxylation of the fatty acids.

13. The method of polymerizing a polyunsaturated fatty acid which is characterized in that polymerization of the fatty acid is conducted by heating the unsaturated fatty acid to a temperature of at least about 260° C. but below the decomposition temperature of the fatty acid, for a period of time which is sufficient for the fatty acid to polymerize, the said heating being conducted in the presence of a small amount of water which is effective to prevent substantial decarboxylation of the fatty acid during the polymerization.

14. A method of preventing decarboxylation of aliphatic carboxylic polyunsaturated fatty acids during heating thereof, at a temperature of at least about 260° C., but below the decomposition temperature of said acids which is characterized in that the heating at such temperature is conducted in the presence of a small amount of water dissolved in the said acids, which is effective to prevent substantial decarboxylation during the heating.

15. The method of altering the degree of unsaturation of the components of a mixture of fatty substances containing saturated, monounsaturated, and polyunsaturated compounds without decomposing any substantial quantity of saturated and monounsaturated compounds, said method comprising heating said mixture at a temperature of at least about 260° C. in the presence of a small proportion of dissolved water, maintained as a liquid by pressure, whereby polymerization of polyunsaturated compounds occurs, the said water being sufficient in amount to prevent substantial decarboxylation but insufficient in amount to support substantial hydrolysis.

CHARLES G. GOEBEL.

REFERENCES CITED

The following references are of record in the file of this patent:

UNITED STATES PATENTS

| Number | Name | Date |
|---|---|---|
| 1,122,400 | Kaempfe | Dec. 29, 1914 |
| 2,155,009 | Fawcett et al. | Apr. 18, 1939 |